United States Patent [19]
Liu et al.

[11] Patent Number: 6,046,878
[45] Date of Patent: Apr. 4, 2000

[54] OBJECT POSITIONING USING DISCRETE SLIDING MODE CONTROL WITH VARIABLE PARAMETERS

[75] Inventors: Zhiqiang Liu; Otis L. Funches, both of Oklahoma City; Randall D. Hampshire, Agra, all of Okla.

[73] Assignee: Seagate Technology, Inc., Scotts Valley, Calif.

[21] Appl. No.: 08/902,566

[22] Filed: Jul. 29, 1997

Related U.S. Application Data

[60] Provisional application No. 60/045,179, Apr. 30, 1997.

[51] Int. Cl.[7] .............................. G11B 5/596; G11B 5/55
[52] U.S. Cl. ..................... 360/75; 360/78.09; 360/77.02
[58] Field of Search .................................. 360/78.09, 75, 360/77.08, 78.04, 78.06, 78.07, 77.02

[56] References Cited

U.S. PATENT DOCUMENTS

| | | |
|---|---|---|
| 5,262,907 | 11/1993 | Duffy et al. . |
| 5,276,662 | 1/1994 | Shaver, Jr. et al. . |
| 5,369,345 | 11/1994 | Phan et al. ...................... 360/78.09 X |
| 5,384,525 | 1/1995 | Kato . |
| 5,442,270 | 8/1995 | Tetsuaki . |
| 5,465,183 | 11/1995 | Hattori ................................ 360/78.09 |
| 5,469,414 | 11/1995 | Okamura ....................... 360/78.09 X |
| 5,510,939 | 4/1996 | Lewis ................................. 360/78.09 |
| 5,585,976 | 12/1996 | Pham . |
| 5,602,689 | 2/1997 | Kadlec et al. .................. 360/78.09 X |
| 5,631,999 | 5/1997 | Dinsmore . |
| 5,699,207 | 12/1997 | Supino et al. ..................... 360/78.09 |
| 5,847,895 | 12/1998 | Romano et al. ................... 360/78.09 |

*Primary Examiner*—Aristotelis M. Psitos
*Assistant Examiner*—James L Habermehl
*Attorney, Agent, or Firm*—Crowe & Dunlevy

[57] ABSTRACT

Apparatus and method for improving vibration and mechanical shock response of a system through the use of discrete-time sliding mode control with variable parameters are disclosed. A servo circuit for positioning a control object (such as a head of a disc drive) includes a reference generator generating position and velocity references, an observer generating position and velocity estimates, and circuitry for determining position and velocity errors therefrom. Variable position and velocity gains are applied to the position and velocity errors, respectively, the position and velocity gains varying with respect to at least the magnitudes of the position errors.

10 Claims, 9 Drawing Sheets

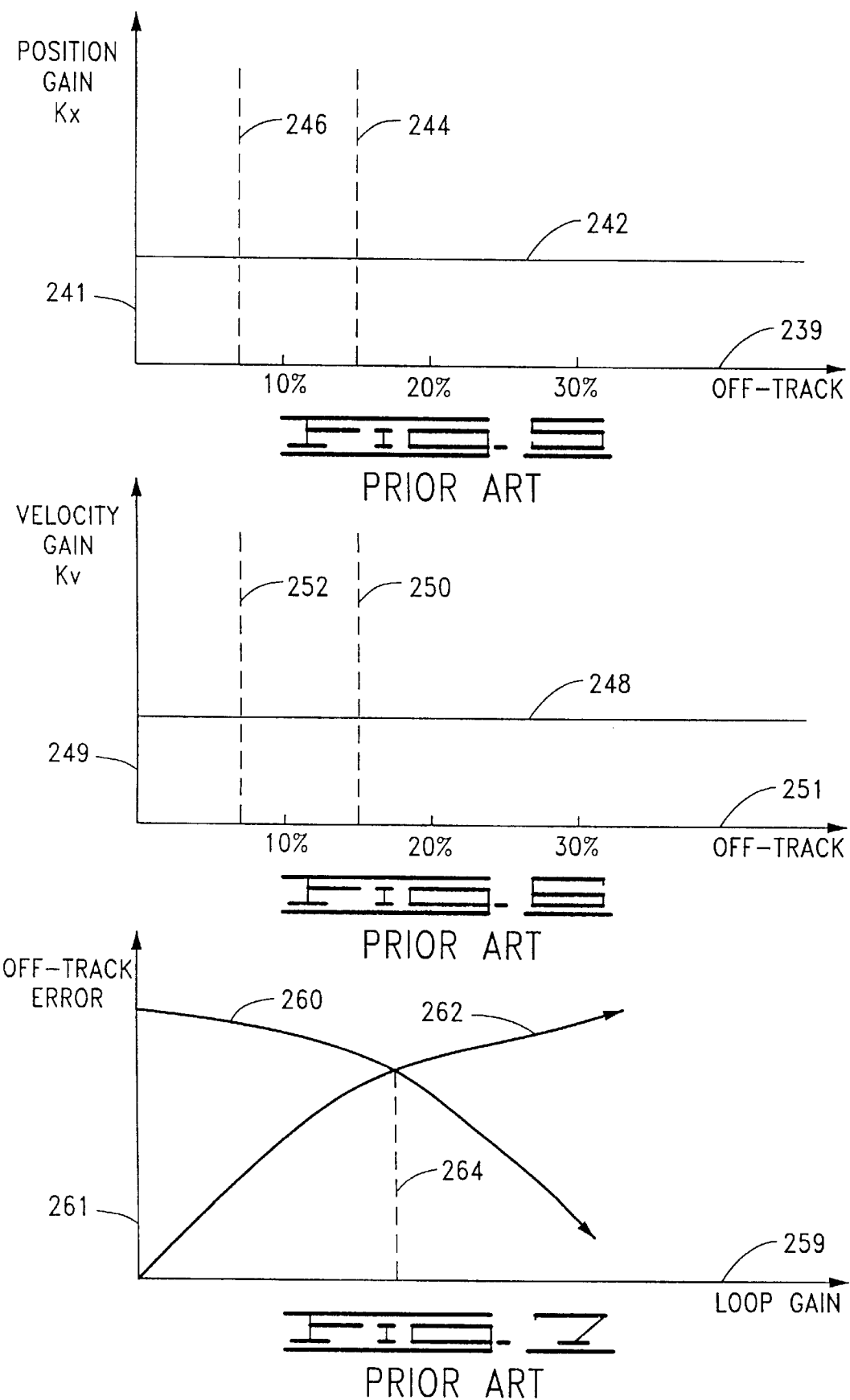

OBJECT POSITIONING USING DISCRETE SLIDING MODE CONTROL WITH VARIABLE PARAMETERS

RELATED APPLICATIONS

This application claims priority to Provisional Application No. 60/045,179 filed Apr. 30, 1997.

FIELD OF THE INVENTION

This invention relates generally to the positioning of control objects, and more particularly, but not by way of limitation, to improving the mechanical shock and vibration response of a disc drive servo system using a discrete sliding mode control with variable parameters methodology.

BACKGROUND OF THE INVENTION

Hard disc drives are commonly used as the primary data storage and retrieval devices in modern computer systems. In a typical disc drive, the data is magnetically stored on one or more discs that are rotated at a constant high speed and accessed by a rotary actuator assembly having a plurality of read/write heads that fly adjacent the surfaces of the discs. A read channel and interface circuit are provided to recover previously stored data from the discs to the host computer.

A closed loop digital servo system such as disclosed in U.S. Pat. No. 5,262,907 issued Nov. 16, 1993 to Duffy et al., assigned to the assignee of the present invention, is typically used to control the position of the heads relative to tracks on the discs. The tracks are defined from servo information that is written to the surfaces of the discs during manufacturing. The servo system of a disc drive thus utilizes the servo information in the performance of two primary operations: seeking and track following.

Seeking entails the movement of a selected head from an initial track to a destination track. More particularly, a velocity-control approach is typically employed wherein the velocity of the head is repetitively determined and compared to a velocity profile which defines an optimum velocity trajectory for the head as it moves to the target track. The amount of current applied to an actuator coil varies in proportion to the velocity error, the actuator coil being part of a voice coil motor used to control the position of the head.

Track following entails the continued positioning of a selected head over a corresponding, selected track. More particularly, a position-control approach is typically employed wherein the relative position of the head with respect to the center of the track is determined and compared to a desired position for the head.

A position error signal (PES) indicative of position error is generated therefrom and used to control the amount of current that is applied to the actuator coil in order to maintain the head at the desired position relative to the track.

As will be recognized, modern disc drives typically employ an embedded servo scheme wherein the servo information is angularly spaced and interspersed among user data fields (commonly referred to as "sectors") on the surfaces of the discs. However, the sampling rate of the servo information is typically insufficient to provide the gain necessary to maintain the heads within predetermined off track boundaries. Accordingly, an observer is deployed to provide estimates of head position, velocity and bias force correction at times when the heads are disposed over the user data fields. Thus, the servo system utilizes position information obtained from the discs to provide the observer with the input required to give estimates for controlling the movement of the heads during seeking and track following. Such observers (also referred to as "estimators") are well known in the art and are discussed, for example, in U.S. Pat. No. 5,585,976 issued Dec. 17, 1996 to Pham, assigned to the assignee of the present invention.

A continuing trend in the disc drive industry is to provide disc drives with ever increasing data storage and transfer rate capacities. For example, some disc drives of the current generation have track densities greater than about 3000 tracks per centimeter (about 8000 tracks per inch). The implementation disc drives with such high track densities (and corresponding high data storage capacities) places greater demands upon the disc drive servo systems in maintaining adequate control of the position of the heads in the presence of external mechanical shock and vibration applied to the drives. For example, it is important to accurately maintain the position of a head over the center of a track during a write operation to prevent the inadvertent overwriting of data on adjacent tracks. Unfortunately, traditional linear control methodologies utilized in prior art disc drive servo system designs have become increasingly deficient in providing adequate control in the presence of significant shock and vibration inputs.

An alternative control methodology known as sliding mode control (SMC) has been found to be useful in certain control applications, such as in the robotics field, wherein servo motors are used to position control objects (such as cantilevered arms) in the performance of various useful tasks. As will be recognized, SMC is a nonlinear system control methodology that is well known for its robustness in handling systems with uncertainties. However, one well known problem with SMC is the so-called "chattering phenomenon", characterized by undesirable oscillation of the control object (due to, for example, overcorrection). Additionally, as the gain of a control system is increased, sensor noise (i.e., errors between actual and measured parameters caused by inaccuracies and offsets in the measurement circuitry) typically causes undesired oscillatory response in the control object. Such detrimental effects can generally be minimized by increasing the sampling rate so that positional information is generally available to the control system on a near continuous basis. Thus, SMC has not proven to be a viable control methodology in disc drives because of the relatively low sampling rates characteristic of disc drive embedded servo designs for head positional control. For a general discussion of previous SMC applications, see for example U.S. Pat. Nos. 5,384,525 and 5,442,270 issued Jan. 24, 1995 and Aug. 15, 1995, respectively, to Kato Tetsuaki.

Accordingly, there is a continual need for improvements in the art whereby the robustness of disc drive servo systems in the presence of mechanical shock and vibration can be enhanced while accommodating ever increasing data storage capacities and transfer rate performance characteristics.

SUMMARY OF THE INVENTION

The present invention provides a method and apparatus for improving the control response of a control system in light of external vibration and mechanical shock inputs through the use of discrete-time sliding mode control with variable parameters (hereinafter also referred to as "DSMCVP").

In accordance with a first preferred embodiment of the present invention, a disc drive is provided having a servo control circuit in which a reference generator generates head position and velocity references, an observer provides head position and velocity estimates, and error circuitry determines a position error in accordance with the difference between the position reference and the position estimate, and a velocity error in accordance with the difference between the velocity reference and the velocity estimate. A plurality of gain blocks are provided so that a variable position gain and a variable velocity gain are applied to the position and velocity errors, respectively.

Particularly, the gain values are low for small values of position and velocity errors, high for large values of position and velocity errors and intermediate gain functions are provided for intermediate values of position and velocity errors, the intermediate functions having boundaries corresponding to the low and high gain values.

A mechanical shock or vibration input will typically introduce position and velocity error into the servo system; however, the larger amounts of gain applied to the velocity and position errors improve the response of the servo system and bring the heads to an acceptable condition faster than in conventional linear control systems.

In accordance with a second preferred embodiment, second order gain blocks are provided so that the position gain is a function of not only the position error, but also the velocity error; likewise, the velocity gain is a flnction of not only the velocity error, but also the position error. Higher order gain blocks including additional parameters, such as acceleration, are also contemplated.

These and various other features as well as advantages which characterize the present invention will be apparent from a reading of the following detailed description and a review of the associated drawings.

BRIEF DESCRIPTION OF THE DRAWINGS

FIG. 6 provides a graphical representation of the linear velocity gain applied to the velocity error Verr by the control diagram of FIG. 4.

FIG. 8 illustrates a control diagram for the disc drive servo control circuit of the disc drive of FIG. 1 in accordance with the first preferred embodiment of the present invention.

FIG. 11 illustrates a control diagram for the disc drive servo control circuit of the disc drive of FIG. 1 in accordance with the second preferred embodiment of the present invention.

DETAILED DESCRIPTION

Figure 1:
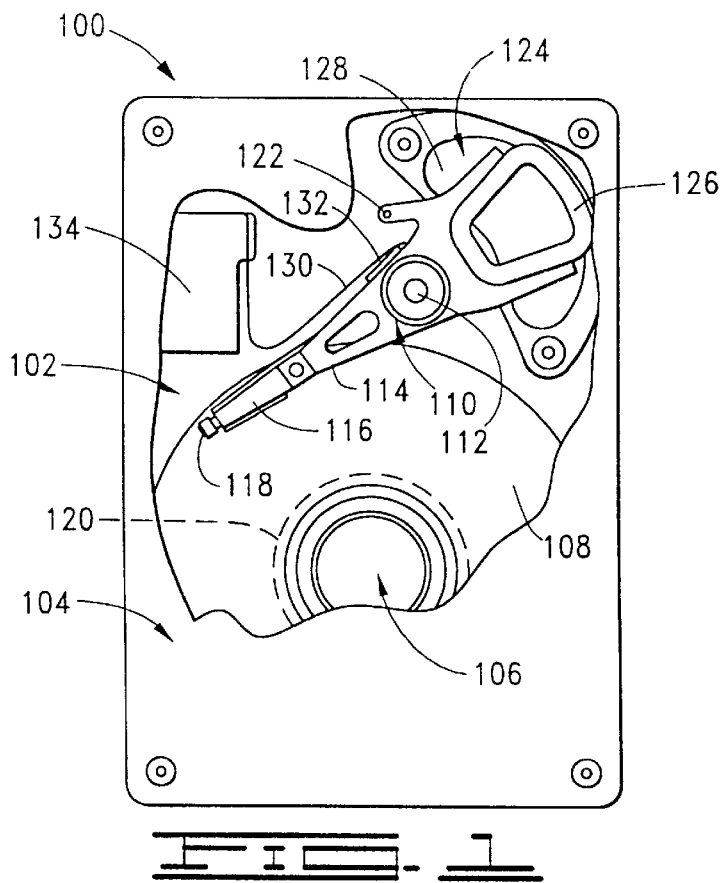
FIG. 1 shows a disc drive constructed in accordance with the preferred embodiments of the present invention.

Referring now to FIG. 1, shown therein is a disc drive 100 constructed in accordance with the preferred embodiments of the present invention. The disc drive 100 includes a base deck 102 to which various components of the disc drive 100 are mounted. A top cover 104 (shown in partial cutaway fashion) cooperates with the base deck 102 to form an internal, sealed environment for the disc drive in a conventional manner.

A spindle motor (shown generally at 106) rotates one or more discs 108 at a constant high speed. Information is written to and read from tracks (not designated) on the discs 108 through the use of an actuator assembly 110, which rotates about a bearing shaft assembly 112 positioned adjacent the discs 108. The actuator assembly 110 includes a plurality of actuator arms 114 which extend toward the discs 108, with one or more flexures 116 extending from the actuator arms 114. Mounted at the distal end of each of the flexures 116 is a head 118 which includes a slider assembly (not separately designated) designed to fly in close proximity to the corresponding surface of the associated disc 108.

When the disc drive 100 is not in use, the heads 118 are moved over landing zones 120 near the inner diameter of the discs 108 and the actuator assembly 110 is secured using a conventional latch arrangement, such as designated at 122.

The radial position of the heads 118 is controlled through the use of a voice coil motor (VCM) 124, which as will be recognized typically includes a coil 126 attached to the actuator assembly 110 as well as one or more permanent magnets 128 which establish a magnetic field in which the coil 126 is immersed. Thus, the controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly 130 includes a printed circuit board 132 to which head wires (not shown) are connected, the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
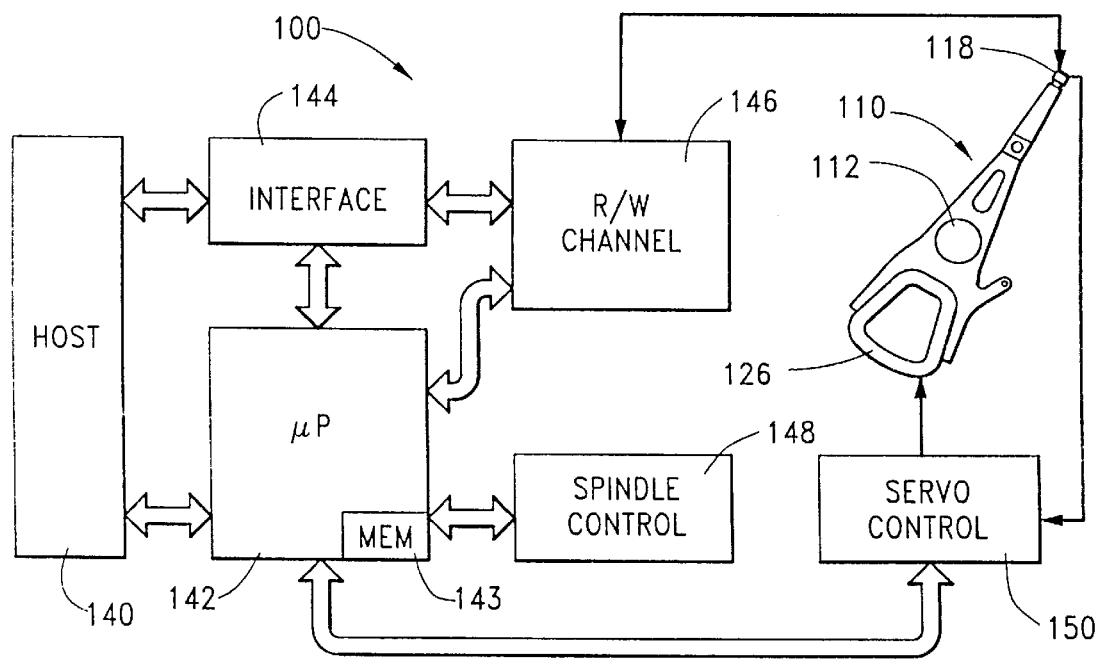
FIG. 2 provides a functional block diagram of the disc drive of FIG. 1 operably connected to a host computer in which the disc drive is mounted.

Referring now to FIG. 2, shown therein is a functional block diagram of the disc drive 100 of FIG. 1, generally showing the main functional circuits which are resident on the disc drive printed circuit board and used to control the operation of the disc drive 100.

The disc drive 100 is shown to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read-only memory (ROM) and other sources of resident memory for the microprocessor 142.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 is thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operation of the disc drive 100 is well known in the art and discussed, for example, in U.S. Pat. No. 5,276,662 issued Jan. 4, 1994 to Shaver et al., assigned to the assignee of the present invention.

The discs 108 are rotated at a constant high speed by a spindle control circuit 148, which electrically commutates the spindle motor 106 (FIG. 1) through the use of back electromotive force (bemf) sensing. Spindle control circuits such as represented at 148 are well known and will therefore not be discussed further herein; additional information concerning spindle control circuits is provided in U.S. Pat. No. 5,631,999 issued May 20, 1997 to Dinsmore, assigned to the assignee of the present invention.

As discussed above, the radial position of the heads 118 is controlled through the application of current to the coil 126 of the actuator assembly 110. Such control is provided by a servo control circuit 150, a functional block diagram of which is provided in FIG. 3.

Figure 3:
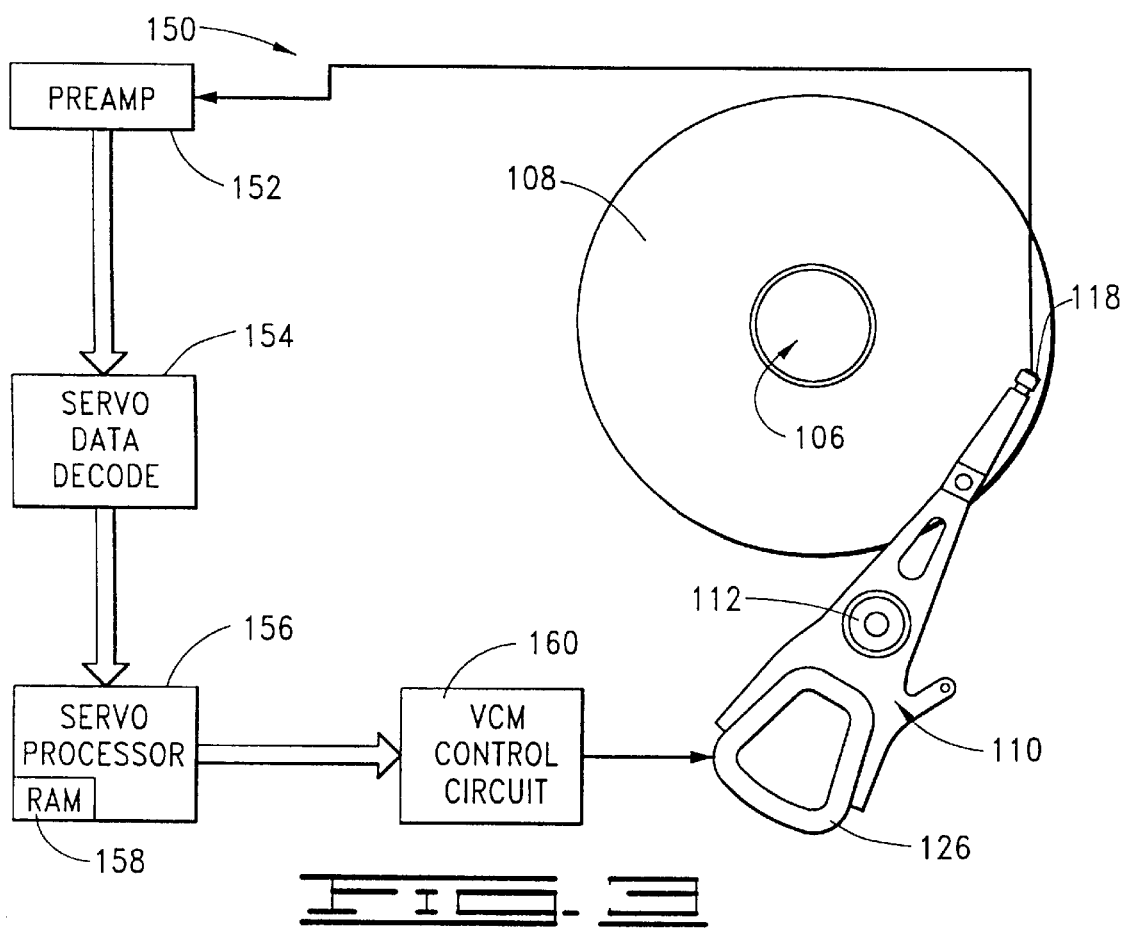
FIG. 3 provides a functional block diagram of a servo control circuit shown in FIG. 2.

Referring now to FIG. 3, the servo control circuit 150 includes a preamp circuit 152, a servo data and decode circuit 154, a servo processor 156 with associated servo RAM 158 and a VCM control circuit 160, all of which cooperate in a manner to be discussed in greater detail below to control the position of the head 118. For reference, the preamp circuit 152 is typically located on the printed circuit board 132 (FIG. 1) as it has been found to be generally advantageous to locate the preamp circuit 152 in close proximity to the heads 118.

It will be recognized that servo control generally includes two main types of operation: seeking and track following. A seek operation entails moving a selected head 118 from an initial track to a destination track on the associated disc surface through the initial acceleration and subsequent deceleration of the head 118 away from the initial track and toward the destination track. Once the head 118 is settled on the destination track, the disc drive 100 enters a track following mode of operation wherein the head 118 is caused to follow the destination track until the next seek operation is to be performed.

During track following, analog burst signals are provided by the head 118 when servo information associated with the track being followed passes under the head 118. The burst signals are amplified by the preamp circuit 152 and provided to the servo data decode circuit 154, which includes analog-to-digital converter (ADC) circuitry that converts the analog burst signals to digital form. The digitized signals are then provided to the servo processor 156, which in the preferred embodiment is a digital signal processor (DSP).

The servo processor 156 determines a position error signal (PES) from the relative magnitudes of the digital representations of the burst signals and, in accordance with commands received from the disc drive microprocessor 142 (FIG. 2), determines the desired position of the head 118 with respect to the track. It will be recognized that, generally, the optimal position for the head 118 with respect to the track being followed is over track center, but offsets (as a percentage of the width of the track) can sometimes be advantageously employed during, for example, error recovery routines. In response to the desired relative position of the head 118, the servo processor 156 outputs a current command signal to the VCM control circuit 160, which includes an actuator driver that applies current of a selected magnitude and direction to the coil 126 in response to the current command signal.

As will be recognized, the servo information on the discs 108 is recorded during the manufacturing of the disc drive 100 using a highly precise servo track writer. The servo information serves to define the boundaries of each of the tracks and is divided circumferentially into a number of frames, with user data fields disposed therebetween. Hence, to provide a sufficient sampling rate for the servo control circuit 150, as described below an observer is provided to generate head position, velocity and bias force estimates to the server processor 156 so that head position and velocity corrections can be performed when the heads 118 are disposed over the user data fields.

Figure 4:
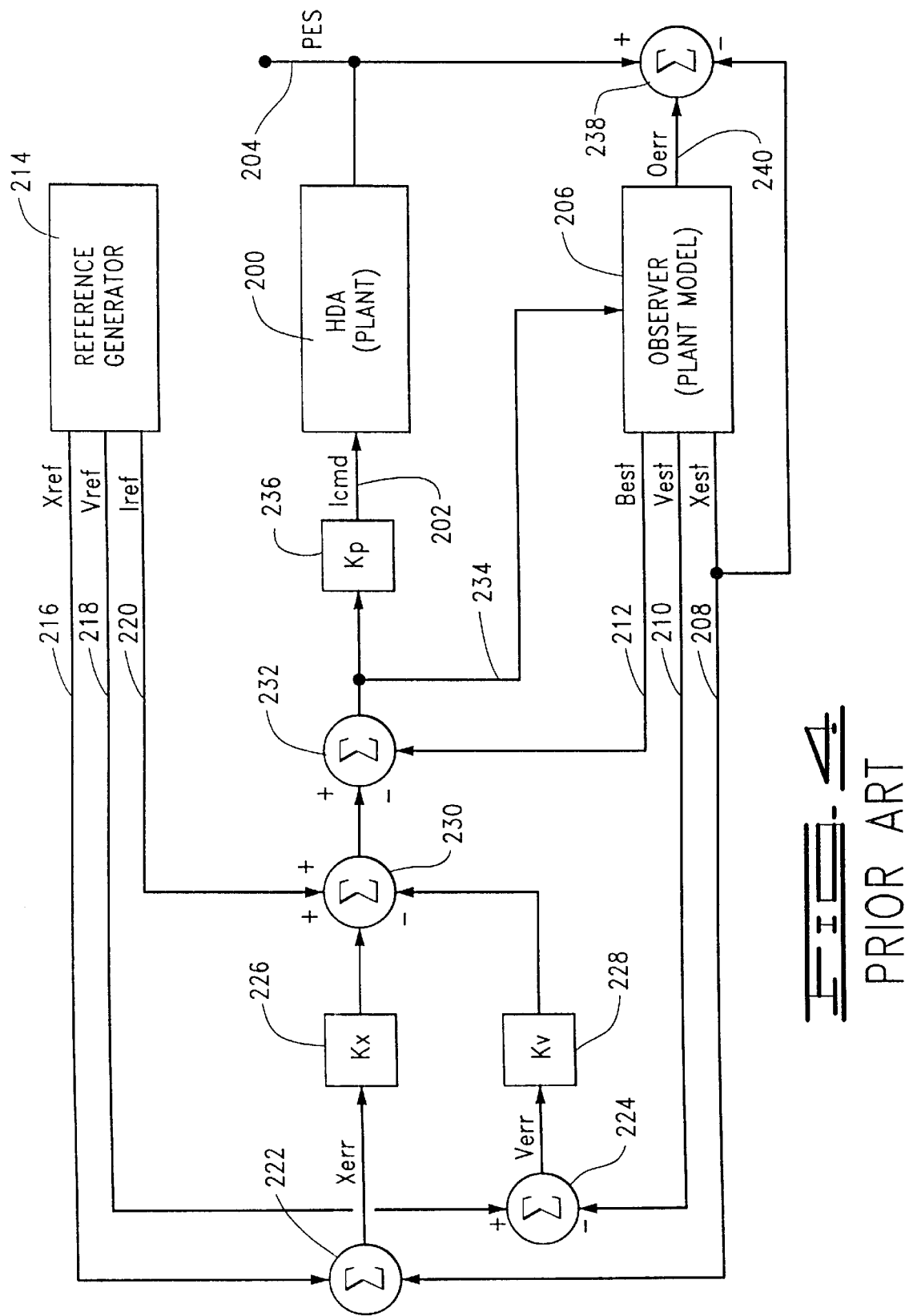
FIG. 4 provides a control diagram for a disc drive servo control circuit employing conventional linear control in accordance with the prior art.

Referring now to FIG. 4, shown therein is a generalized control diagram a servo control circuit of a disc drive employing a linear control methodology in accordance with the prior art. As will be recognized, portions of the control diagram of FIG. 4 can be advantageously implemented in a DSP.

As shown in FIG. 4, a head/disc assembly (HDA), which will hereinafter also be referred to as the "plant", is generally denoted by block 200. The plant 200 receives a current command signal ("Icmd") on signal path 202 to position a selected head (not shown) adjacent a selected track (also not shown) of the plant 200. In response to servo information on the track, the plant 200 generates a PES which is output on signal path 204.

The control diagram of FIG. 4 also shows an observer 206, or plant model, which is designed to have the same input/output response characteristics as the plant 200. As will be recognized by those skilled in the art, the observer 206 generates a position estimate ("Xest"), a velocity estimate ("Vest") and a bias estimate ("Best") on signal paths 208, 210 and 212, respectively, which correspond to estimates of head position, head velocity and bias force. The bias force estimate takes into account spring forces exerted upon the actuator as a result of the flexure assembly (such as 130 of FIG. 1), windage forces upon the heads, and the like.

Additionally, a reference generator is provided which provides position reference ("Xref"), velocity reference ("Vref") and current reference ("Iref") signals indicative of the desired position, velocity and current settings for the plant 200. These signals are output on paths 216, 218 and 220, respectively and have values which generally depend upon the particular operational mode of the servo circuit, such as track following or seeking. As will be recognized, the current reference Iref is typically provided with a value of zero during track following.

A summing junction 222 determines a position error ("Xerr") as the difference between the position reference Xref and the position estimate Xest, as shown. Similarly, a summing junction 224 determines a velocity error ("Verr") as the difference between the velocity reference Vref and the velocity estimate Vest, as shown. The position error Xerr is provided to a gain block 226 having a scalar gain of Kx and the velocity error Verr is provided to a gain block 228 having a scalar gain of Kv, so that the output quantities are summed by a summing junction 230 (along with the current reference Iref).

The output of the summing junction 230 is further summed with the bias estimate Best at a summing junction 232, as shown. The output of the summing junction 232 is provided on signal path 234 as a control input to the observer 206 and is indicative of the amount of current to be applied to the plant 200. However, to account for nominal variations in the operation of the plant 200, the output of the summing junction 232 is also provided to a gain block 236 having a gain identified as Kp, so that the output thereof comprises the current command Icmd signal on path 202. As will be recognized, the gain Kp can be adjusted in a conventional manner to ensure the observer 206 accurately models the plant 200.

Finally, the PES on signal path 204 is summed with the position estimate Xest on path 208 by a summing junction 238 to generate an observer error ("Oerr") signal as an input to the observer 206 on path 240.

Accordingly, the operation of the control system of FIG. 4 is generally governed as follows:

$$Xerr = Xref - Xest \quad (1)$$

$$Verr = Vref - Vest \quad (2)$$

$$Oerr = PES - Xest \quad (3)$$

$$Icmd = ((Xerr)(Kx) + (Verr)(Kv) + Iref - Best)(Kp). \quad (4)$$

Figure 5:
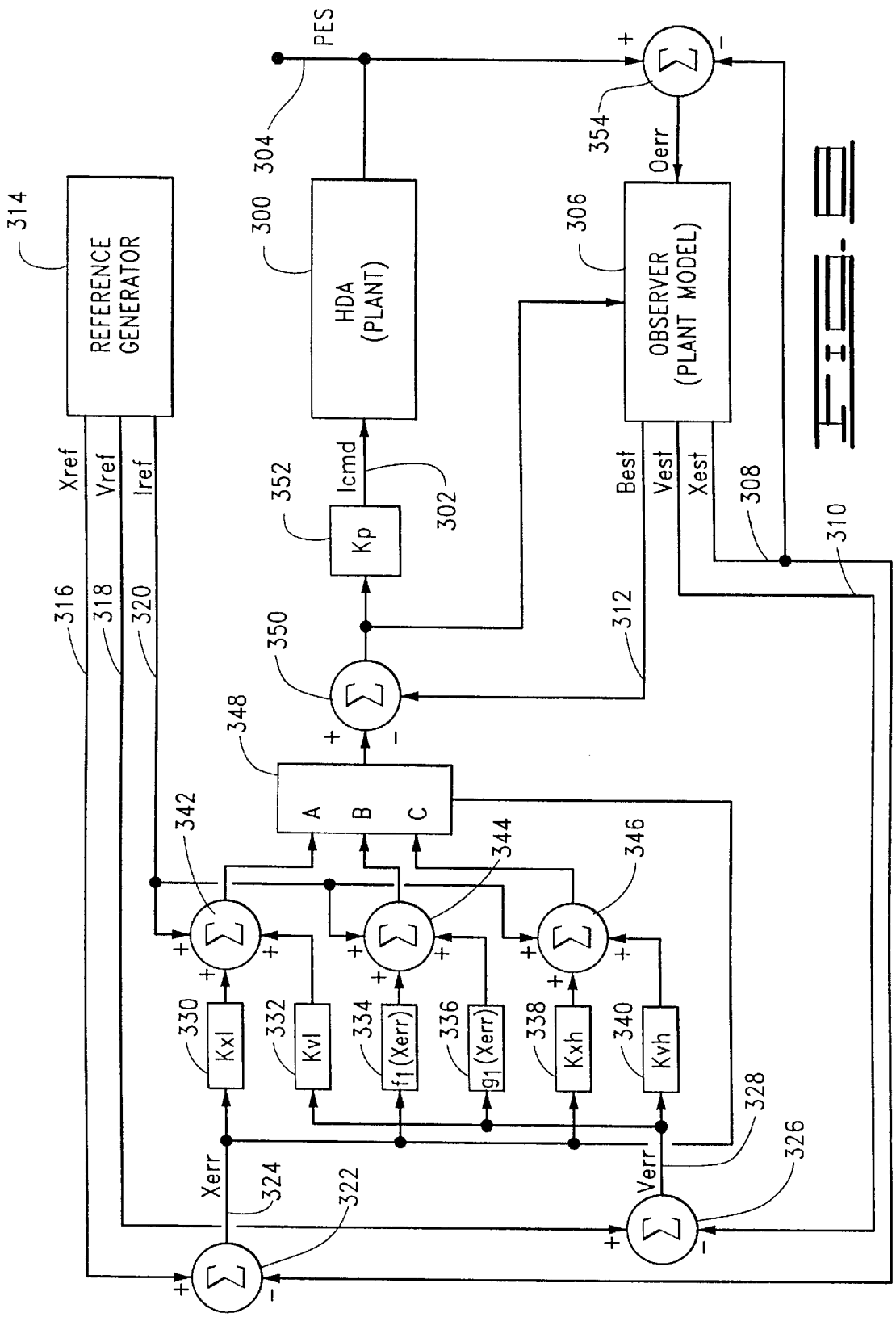
FIG. 5 provides a graphical representation of the linear position gain applied to the position error Xerr by the control diagram of FIG. 4.

Referring now to FIG. 5, shown therein is a graphical representation of the position gain Kx with respect to position error Xerr for the control system of FIG. 4. More particularly, the x-axis of FIG. 5 (identified at 239) shows the position error Xerr in terms of percentage of the overall track width (or "off-track"). Thus, the origin on the x-axis corresponds to the head being positioned over the center of the track (or otherwise a selected, desired offset for the head), the 10% mark indicates that the head is 10% off-track, and so on. Likewise, the y-axis (identified at 241) indicates the position gain Kx, corresponding to the scalar gain value of the gain block 226 of FIG. 4.

As shown in FIG. 5, the position gain Kx (denoted by horizontal line 242) is constant with respect to position error Xerr, as is typical in servo systems employing conventional linear control techniques.

A write fault threshold (denoted by vertical, broken line 244) is also shown in FIG. 5, with the write fault threshold indicative of the threshold at which a write fault is declared during a disc drive write operation. That is, for the write fault threshold 244 of FIG. 5 (which corresponds to an off-track error of 15%), a position error Xerr of 15% or greater during a write operation will result in the suspension of the write operation until the position error can be brought down within the threshold. As will be recognized, the write fault threshold value is used to prevent the inadvertent overwriting of data on adjacent tracks and is typically selected based upon the requirements of a given application.

A second vertical, broken line 246 is also provided in FIG. 5, corresponding to a position error Xerr of about 7% and indicates a typical distribution in PES variation for the disc drive. Although ideally a head will be caused to remain positioned exactly over the center of a track (or otherwise a selected offset point with respect to the center of the track) during a track following mode of operation, in reality, factors such as bearing tolerances, disc stack misalignments, electrical offsets and errors in the placement of the servo information will cause the PES to vary within a selected range. Thus, if this variation is considered to be generally gaussian in nature, the line 246 can be considered to correspond to a 3-sigma point for the PES distribution. As will be recognized, this PES variation operates to further reduce the available margin so that relatively smaller amounts of shock or vibration can introduce a position error Xerr beyond the write fault threshold 244.

FIG. 6 provides a graphical representation of the velocity gain Kv (indicated along y-axis at 249) with respect to position error Xerr (indicated along x-axis at 251) for the control system of FIG. 4. The graph of FIG. 6 is similar to that of FIG. 5, in that the velocity gain Kv (denoted by horizontal line 248) remains constant with respect to the amount of position error Xerr. For reference, the write fault threshold and PBS distribution cut-off points are indicated by broken lines 250 and 252, respectively.

Figure 7:
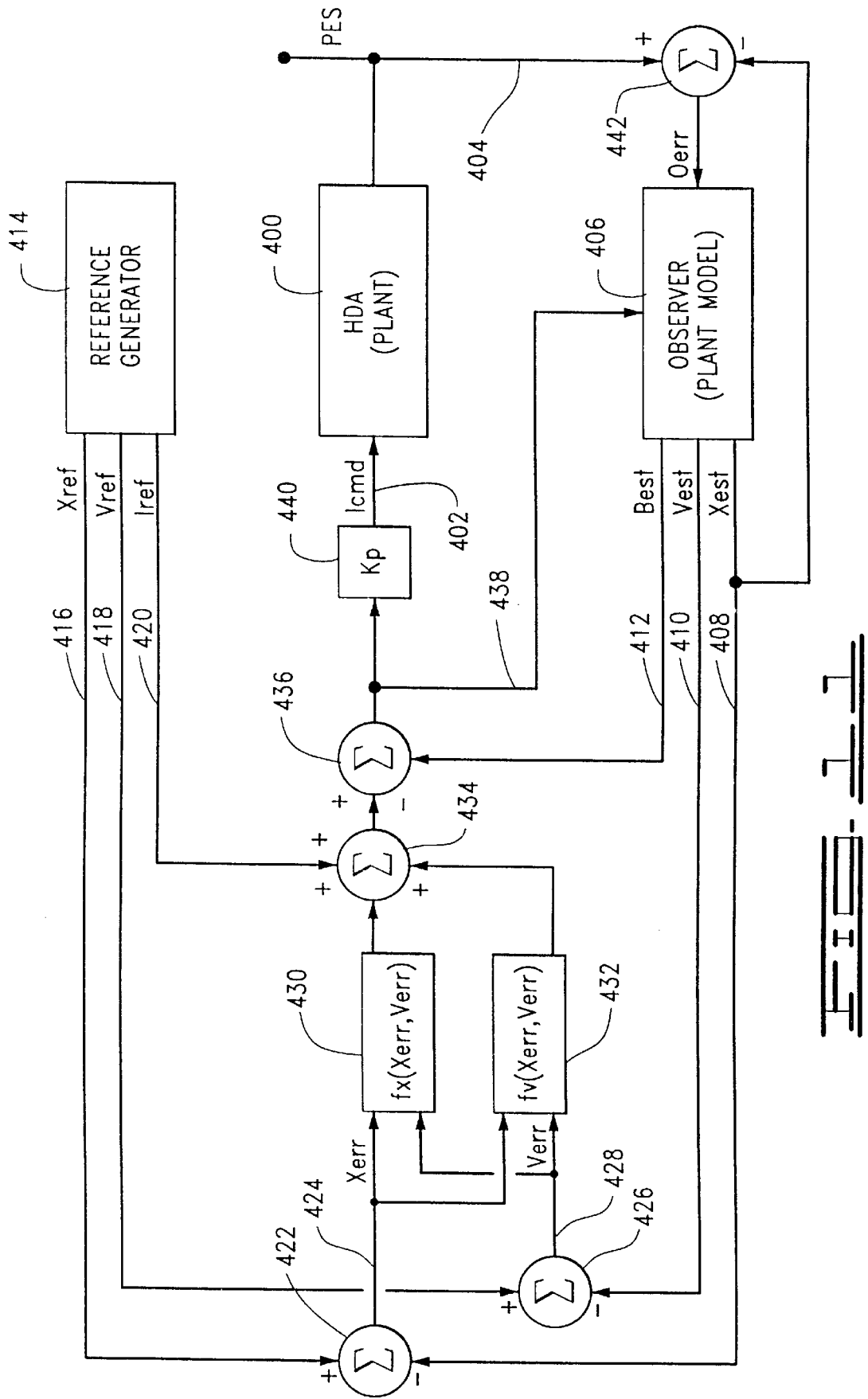
FIG. 7 provides a graphical representation of offtrack position error versus gain caused by error sources including external vibration and shock inputs, as well as by sensor noise for the control diagram of FIG. 4.

As will be recognized from a review of FIGS. 5 and 6, a shock event that introduces a large amount of position error Xerr can require a considerable amount of time to correct, as the gains applied to the control system of FIG. 4 are linear and constant with respect to the position error Xerr. Generally, the greater the overall gain of the servo control system, the faster the response of the system to shock inputs that introduce significant amounts of position error Xerr into the system. However, increasing the overall gain beyond an optimal point introduces additional position errors into the servo loop as a result of sensor noise (i.e., errors in the estimated parameters provided by the observer 206). FIG. 7 provides a graphical representation of this situation, wherein are shown two curves plotted along an x-axis (259) indicative of loop gain and a y-axis (261) indicative of off-track errors. Curve 260 shows that off-track errors due to mechanical disturbances such as shock and vibration decrease with increases in the overall gain, and curve 262 shows that off-track errors due to sensor noise increase with increases in the overall gain. Accordingly, as a compromise the optimum overall gain for a disc drive servo system has generally been chosen at a point where these two curves 260, 262 intersect, as indicated by broken line 264.

Having concluded a discussion of conventional linear control methodologies characteristic of prior art disc drive servo systems, reference is now made to FIG. 8, which provides a control diagram for the disc drive 100 of FIG. 1 in accordance with the first preferred embodiment of the present invention. In a manner similar to that for the control diagram of FIG. 4, various components represented in FIG. 8 are preferably realized in programming used by the servo processor (DSP) 156 of FIG. 3.

As shown in FIG. 8, an HDA block 300 is provided, with the HDA (or plant) generally corresponding to selected portions of the disc drive 100 (for example, the discs 108, heads 118, VCM 124, and portions of the servo control circuit 150). Thus, as with the plant 200 of FIG. 4, the plant 300 of FIG. 8 receives a current command Icmd on path 302 and, in response thereto, generates a PES on signal path 304.

The control diagram of FIG. 8 further comprises an observer (plant model) 306 which likewise generates head position estimate Xest, head velocity estimate Vest and bias force estimate Best on paths 308, 310 and 312, respectively. A reference generator 314 generates position reference Xref, velocity reference Vref and current reference Iref signals on paths 316, 318 and 320, respectively.

As with FIG. 4, the position estimate Xest and the position reference Xref of FIG. 8 are provided to a summing junction 322, the output of which comprises a position error Xerr signal on path 324. Similarly, the velocity estimate Vest and the velocity reference Vref are provided to a summing junction 326, the output of which comprises a velocity error Verr signal on path 328.

However, unlike the conventional linear control system of FIG. 4, the system of FIG. 8 employs discrete-time sliding mode control with variable parameters (DSMCVP). That is, the position and velocity errors Xerr and Verr are provided to three sets of gain blocks, the outputs of which are selected based upon the amount of position error Xerr, as explained below.

Generally, the first set of gain blocks comprises a low position gain block 330 with gain Kxl and a low velocity gain block 332 with gain Kvl, and are used when the position error Xerr is low. The next set of gain blocks comprises an intermediate position gain block 334 having a gain function $f_1(Xerr)$ and an intermediate velocity gain block 336 having a gain function $g_1(Xerr)$, with the gain blocks 334 and 336 being employed when the position error Xerr has an intermediate value. As discussed in greater detail below, the gains of the intermediate blocks 334, 336 vary with respect to the position error Xerr. Finally, the third set of gain blocks are used for relatively high values of position error Xerr and comprises a high position gain block 338 having gain Kxh and a high velocity gain block 340 having gain Kvh.

The outputs of the various gain blocks 330, 332, 334, 336, 338 and 340 are summed by corresponding summing junctions 342, 344 and 346 with the current reference Iref from signal path 320 as shown. The outputs of the summing junctions 342, 344 and 346 are provided as A, B, and C inputs to a switch 348, controlled by the position error Xerr. Depending upon the value of the position error Xerr, the corresponding one of the A, B, or C inputs will be passed on to a summing junction 350 for summation with the bias force estimate Best. As before, the output of the summing junction 350 is provided as a current command signal to the observer 306 and is also provided to a gain block 352 having gain Kp, with the gain Kp being selected to match the transfer characteristics of the observer 306 with that of the plant 300.

Finally, it will be recognized that the output of the gain block 352 comprises the current command Icmd signal on path 302 and the PES on path 304 is summed with the position estimate Xest of path 308 by summing junction 354 to provide an observer error Oerr signal to the observer 306.

Figure 9:
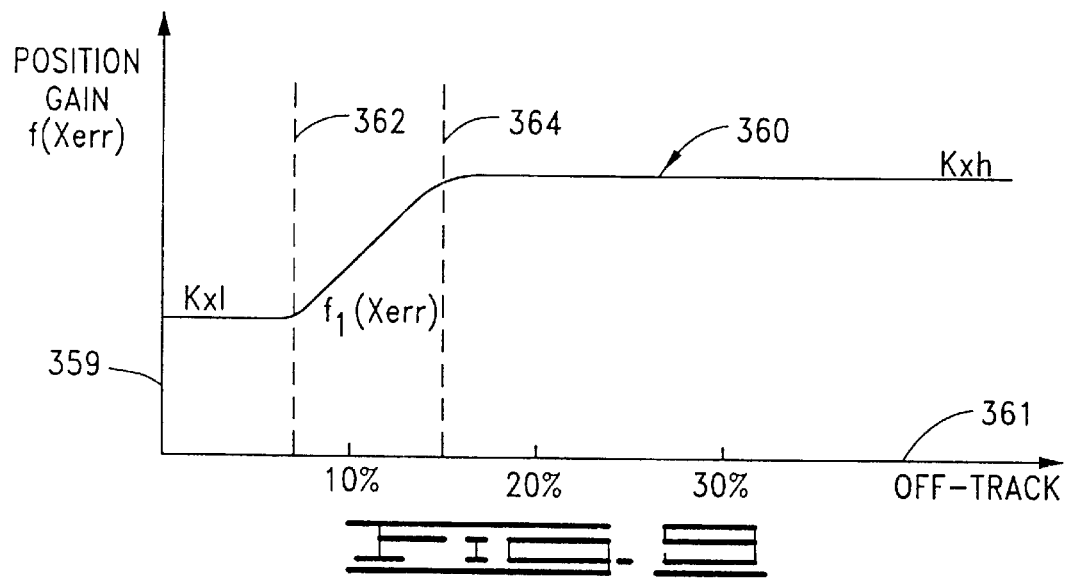
FIG. 9 provides a graphical representation of the variable position gain applied to the position error Xerr by the control diagram of FIG. 8.

To illustrate the operation of the control system of FIG. 8, reference is now made to FIG. 9 which provides a graphical representation of the position gain of the system (along y-axis indicated at 359) with respect to position error Xerr (along x-axis indicated at 361). The position gain is identified as the function f(Xerr) and is plotted in FIG. 9 by segmented curve 360. Particularly, the position gain f(Xerr) is defined by the following relation:

$$f(Xerr) = \begin{cases} Kxl, & \text{when } 0 < Xerr \leq 7\% \\ f_1(Xerr), & \text{when } 7\% < Xerr < 15\% \\ Kxh, & \text{when } Xerr \geq 15\%. \end{cases} \quad (5)$$

Thus, the position gain has a value of Kxl when the position error Xerr is between the origin and a vertical, broken line 362 (which corresponds to the nominal PES distribution cut-off point and is 7% in the present example), with Kxl being a relatively low, scalar gain value. Further, the position gain has a value of Kxh when the position error Xerr is greater than the write fault threshold, which is identified by vertical, broken line 364 (and is 15% in the present example), with Kxh being a scalar gain value which is greater than the scalar gain Kxl. Finally, when the position error Xerr has a value that is between the boundaries 362 and 364 (i.e., between 7% and 15%), the position gain will vary in accordance with the function $f_1(Xerr)$. The function $f_1(Xerr)$ has boundary values corresponding to Kxl and Kxh so that the overall function f(Xerr) is continuous; the shape of the function $f_1(Xerr)$ can be selected as required, however, and can be straight or curvilinear (as in FIG. 9). Moreover, the values for $f_1(Xerr)$ can be calculated on-the-fly, or alternatively stored in a look up table used by the servo processor 156.

Figure 10:
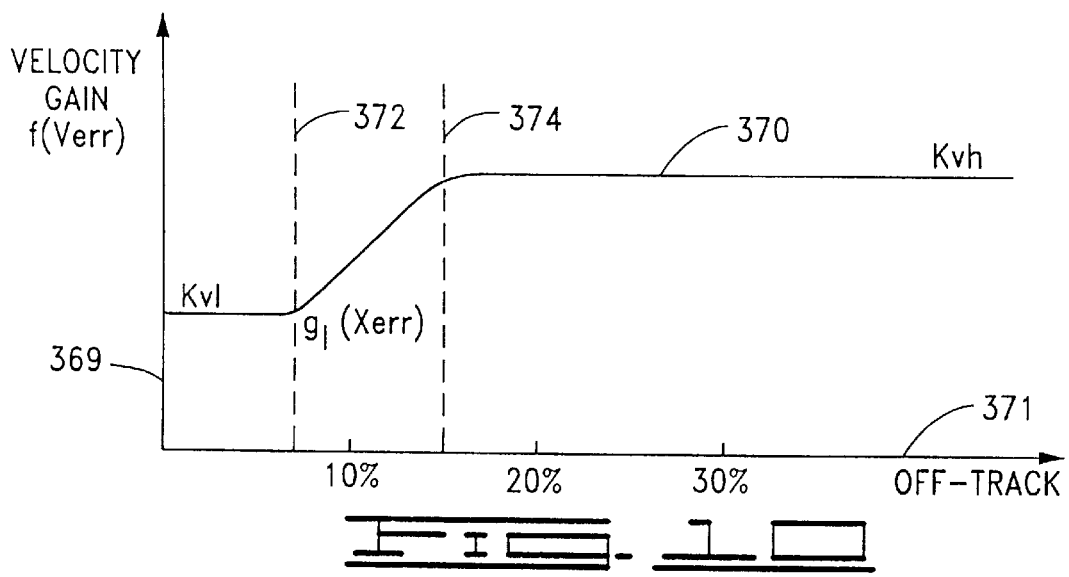
FIG. 10 provides a graphical representation of the variable velocity gain applied to the velocity error Verr by the control diagram of FIG. 8.

In a similar fashion, FIG. 10 provides a graphical representation of velocity gain (along y-axis 369) versus position error Xerr (along x-axis 371) for the control system of FIG. 8. More particularly, the velocity gain is expressed as the function g(Xerr) plotted in FIG. 10 by segmented curve 370 and defined as follows:

$$g(Xerr) = \begin{cases} Kvl, & \text{when } 0 < Xerr \leq 7\% \\ g_1(Xerr), & \text{when } 7\% < Xerr < 15\% \\ Kvh, & \text{when } Xerr \geq 15\%. \end{cases} \quad (6)$$

Thus, the velocity gain g(Xerr) is dependent upon the amount of position error Xerr and will have scalar value Kvl when position error Xerr is between 0% and 7% (corresponding to the PES distribution cut-off point as indicated by vertical, broken line 372). The velocity gain will have scalar value Kvh when the position error Xerr is greater than 15% (corresponding to the write fault threshold as indicated by vertical, broken line 374). Finally, the velocity gain will have a varying value when the position error Xerr is between 7% and 15%, with the velocity gain $g_1(Xerr)$ being a function of the position error Xerr. As before, the intermediate velocity gain function $g_1(Xerr)$ has boundary values of Kvl and Kvh, but can otherwise take a variety of forms depending upon the application.

Accordingly, the control system of FIG. 8 will operate using linear control techniques when small amounts of position error Xerr are present in the system. That is, during normal operation the position error Xerr will generally fall within the range defamed by line 372 (FIG. 9) and the gains Kxl and Kvl will be applied.

However, when a shock or vibration event introduces a large amount of position error Xerr into the system, higher gains are employed to quickly reduce the position error Xerr and bring the head 118 back to the desired control position.

For example, it was found that in one particular disc drive application, a 11 millisecond, 20 g shock event introduced a position error Xerr of greater than 30% of the track width. Accordingly, such events will cause the application of the higher gains Kxh, Kvh and $f_1$(Xerr), $g_1$(Xerr) to the system, which will significantly reduce the time required to bring the position error Xerr down to an acceptable level. The stability of the control system in the presence of such shock and vibration events, and factors to be considered when selecting the various position and velocity gain values will be discussed in greater detail below.

Referring now to FIG. 11, shown therein is a control diagram for a second preferred embodiment of the present invention. The control diagram of FIG. 11 is generally similar to that previously discussed with regard to FIG. 8 and portions of the control diagram of FIG. 11 can be readily implemented in the servo processor (DSP) 156 of FIG. 3.

As shown in FIG. 11, an HDA (plant) 400 is provided with a current command Icmd input on path 402 and, in response thereto, outputs a PES on path 404. An observer (plant model) 406 outputs position, velocity and bias force estimates (Xest, Vest and Best) on paths 408, 410 and 412. A reference generator 414 similarly generates position, velocity and current references (Xref, Vref and Iref) on paths 416, 418 and 420.

As before, a position error Xerr is determined from the position estimate Xest and the position reference Xref which are summed by a summing junction 422. The position error Xerr is output by the summing junction 422 on path 424 as shown. Similarly, a velocity error Verr is determined at summing junction 426 and output on path 428 through the summation of the velocity estimate Vest and the velocity reference Vref.

The position and velocity errors Xerr, Verr are both provided as inputs to two gain blocks 430, 432 having position and velocity gain functions $f_X$(Xerr, Verr) and $f_V$(Xerr,Verr), respectively. The outputs of the gain blocks 430, 432 are summed by a summing junction 434 with the current reference Iref from path 420 and the output of the summing junction 434 is then summed by a summing junction 436 with the bias force estimate Best from path 412, as shown. As before, the output of the summing junction 436 is indicative of the current applied to the actuator coil of the plant 400 and is provided to the observer 406 on path 438. The output of the summing junction 436 is further applied to gain block 440 having gain Kp, the output of the gain block 440 comprising the current command Icmd signal on path 402. Finally, as before the PES is summed with the position estimate Xest (at summing junction 442) to provide an observer error (Oerr) signal to the observer 406.

Figure 12:
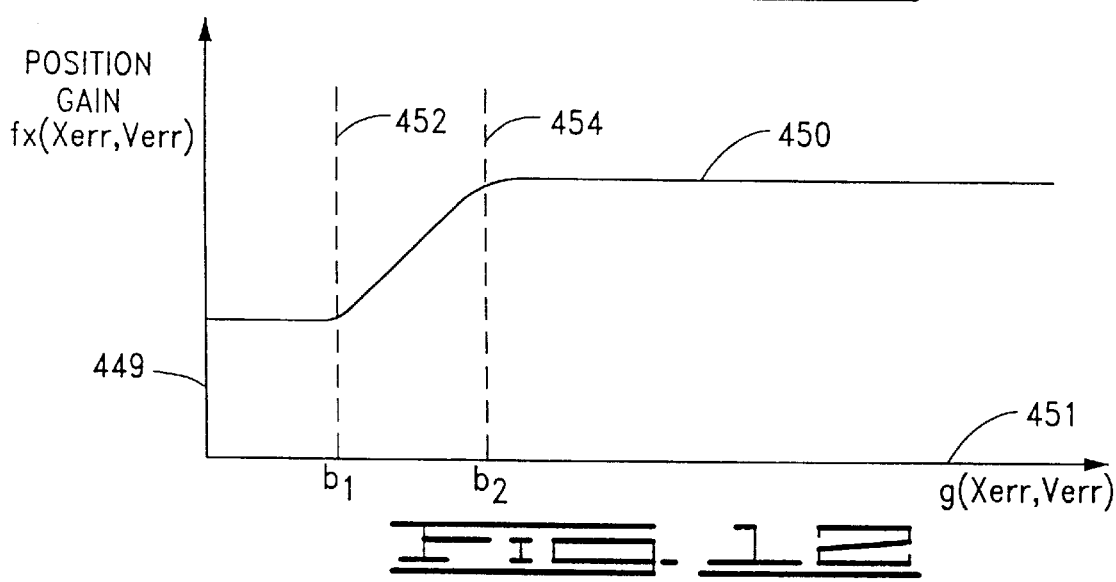
FIG. 12 illustrates the variable position gain of the control diagram of FIG. 11 as a function of both the position error Xerr and the velocity error Verr.
Figure 13:
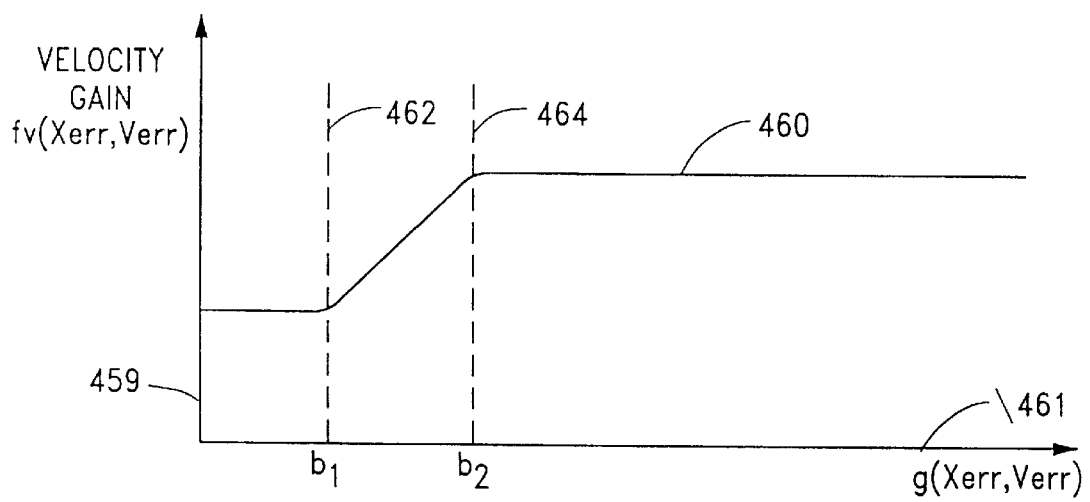
FIG. 13 illustrates the variable velocity gain of the control diagram of FIG. 11 as a function of both the position error Xerr and the velocity error Verr.

The position and velocity gain functions $f_X$, $f_V$ of the gain blocks 430, 432 are represented graphically in FIGS. 12 and 13 and vary with respect to both the position and velocity errors Xerr, Verr. Referring first to FIG. 12, the position gain function $f_X$ is represented by curve 450 and is plotted against a position gain y-axis (449) and an x-axis (451) in terms of a combined function g(Xerr, Verr) which is defined by the following relation:

$$g(\text{Xerr}, \text{Verr}) = h\text{Xerr} + \text{Verr} \quad (7)$$

with h being a constant (such as h=0.01). The position gain curve 450 of FIG. 12 varies with respect to g(Xerr, Verr) and generally has a relatively low value for low values of position and velocity error Xerr, Verr, as shown by the portion of the curve 450 within the range between the origin and a value of g(Xerr, Verr)=$b_1$, as indicated by vertical, broken line 452. The boundary $b_1$ generally corresponds to the PES distribution cut-off points discussed previously with respect to FIGS. 5, 6, 9 and 10, except that the boundary $b_1$ takes into account nominal distributions for both position and velocity errors Xerr, Verr. The position gain curve 450 further has a relatively high value for large position and velocity errors Xerr, Verr, as shown by the portion of the curve 450 beyond vertical, broken line 454 corresponding to a value of g(Xerr, Verr)=$b_2$. As before, the boundary $b_2$ generally corresponds to a write fault threshold in terms of both position and velocity errors Xerr, Verr. Finally, the position gain curve 450 takes a curvilinear shape between the lines 452, 454, as shown. A similar velocity gain curve 460 with lines 462, 464 for the boundaries $b_1$, $b_2$ are shown in FIG. 13, plotted against velocity gain y-axis 459 and g(Xerr, Verr) x-axis 461.

It will be recognized that although the control systems of FIGS. 8 and 11 have been generally discussed in terms of operation during track following, the control systems will also provide improved disc drive performance during seeking. That is, velocity errors Verr introduced by vibration and shock events that cause the trajectory of the heads 118 to vary from the velocity profile established for a seek can also be readily corrected through changes in the position and velocity gains in accordance with the foregoing discussion. Moreover, it will be recognized that although the control system of FIG. 11 employs second-order models for the position and velocity gain functions $f_X$ and $f_V$, higher order models could be employed (further including, for example, acceleration error, etc.).

Having concluded the discussion of the preferred embodiments of the present invention, the stability of the control system in the presence of shock and vibration events, and factors to be considered when selecting the various position and velocity gain values will now be presented.

As will be recognized, the operation of the disc drive 100 (FIG. 1) can be modeled as a single input, single output continuous linear time-invariant (SISO LTI) system with the following state equations:

$$\dot{x}(t) = Ax(t) + Bu(t) + w(t) \quad (8)$$

$$y(t) = Cx(t) + v(t) \quad (9)$$

where x(t) is an n-dimension state vector, u(t) is a scalar input, y(t) is a scalar output, w(t) is an n-vector disturbance reflecting external and internal uncertainties and v(t) is a scalar which represents sensor noise. A, B and C are constant matrices of appropriate dimensions describing the system of equations (8) and (9) and the set {A, B, C} is complete (i.e., controllable and observable).

Using a digital controller and a zero-order hold to provide a control input u, the equivalent discrete-time model is given by:

$$x(k+1) = A_d x(k) + B_d u(k) + W_d(k) \quad (10)$$

$$y(k) = Cx(h) + v(h) \quad (11)$$

where $$A_d = e^{AT}$$

$$B_d = \int_0^T e^{A\tau} B \, d\tau$$

$$w_d = \int_0^T e^{A\tau} w((k+1)T - \tau) d\tau$$

$$v(k) = v(t)|_{t=KT}$$

and T is the sampling period chosen such that the discrete-time system of equations (10) and (11) is also controllable and observable.

A switching function is defamed as a linear fuinction of the states:

$$s = G\tilde{x} = G(x_d - x) \quad (12)$$

where $X_d$ is a reference input and G is a row vector.

A reaching condition is used to guarantee the existence of the ideal quasi-sliding mode. That is, under the given reaching condition, the system states should move to the sliding surface or its neighborhood from any initial point in the state space and eventually converge to the origin (or its neighborhood), as the sliding surface has been chosen as a stable manifold.

The following reaching condition is used:

$$s(k+1) = (1-\eta)s(k) - Ksat\left(\frac{s(k)}{\phi}\right) \quad (13)$$

where K is a positive number referred to as the control gain for the control system, $\eta$ is a positive number determining the response in the reaching phase, $\phi$ is a positive constant referred to as the thickness of the boundary layer, and sat(.) is the saturation function. In order to make the sliding surface attractive, K, $\eta$ and $\phi$ are chosen such that $0<K<\phi$ and $0<\eta<1$.

It will be recognized that if K and $\phi$ are chosen such that $\phi<K<2\phi$ and $-1<\eta<0$, then the sliding surface is also attractive. However, an oscillatory response will result which is undesirable due to the potential for exciting unmodeled dynamics in the disc drive 100.

The reaching condition of equation (13) has several advantages. First, it describes a direct relation between s(k+1) and s(k), thus making it easier to derive the control law. Second, the saturation function can be used as a simple and effective way to reduce both the undesired oscillation in the reaching phase of the DSMCVP and the chattering in the linear region. This will be discussed in greater detail below.

Using the previously defined reaching condition of equation (13), substituting equations (10) and (11) into equation (13) and solving for u(k) gives the following control law:

$$u(k) = \frac{1}{(GB_d)}(G[((1-\eta)I - A_d)x(k) + \eta x_d(k) + \Delta x_d(k) - w_d(k)] + Ksat\left(\frac{s(k)}{\phi}\right)) \quad (14)$$

It will be recognized that the disturbance term $w_d(k)$ is unknown, so it will be replaced by an estimation term $\hat{W}_d(k)$ in order to obtain a realizable control law. Further, when only partial states are measurable, an observer (such as the observer 306 of FIG. 8 or 406 of FIG. 11) is necessary to estimate the full states. Thus, the control law becomes:

$$u(k) = \frac{1}{(GB_d)}(G[((1-\eta)I - A_d)\hat{x}(k) + \eta x_d(k) + \Delta x_d(k) - \hat{w}_d(k)] + Ksat\left(\frac{\hat{s}(k)}{\phi}\right)) \quad (15)$$

where $\hat{s}(k) = G(x_d(k) - \hat{x}(k))$ $\hat{x}$ = estimation of states.

To design the observer (such as 306 in FIG. 8 or 406 in FIG. 11) to estimate the full states in the control law of equation (15), any conventional observer design, such as a Kalman filter, can be used. Emphasis should be placed, however, on fast convergence and good noise rejection performance. In the preferred embodiment, the observer is of the Luenberger type and is described as follows:

$$\hat{x}(k+1) = (A_d - LC)\hat{x}(k) + B_d u(k) + Ly(k) \quad (16)$$

with the estimation error dynamics given by:

$$z(k+1) = (A_d - LC)z(k) + w_d(k) - Lv(k) \quad (17)$$

where $z(k) = x(k) - \hat{x}(k)$.

The stability of the control system can be shown as follows. First, assuming that the eigenvalues of $(A_d - LC)$ are chosen to be inside the unit circle, then the discrete time system of equations (10) and (11) under the control law of equation (15) using the observer of equation (16) will have the following properties: the sliding surface is asymptotically attractive if there is no uncertainty and sensor noise; that is, $\hat{s}(k) \to 0$ as $k \to \infty$ if $w_d(k)=0$ and $v(k)=0$; and the sliding function $\hat{s}(k)$ will be bounded if $w_d(k)$ and $v(k)$ are bounded.

Next, assuming that the eigenvalues of $(A_d - LC)$ are chosen to be inside the unit circle and the sliding surface is determined such that the equivalent dynamics:

$$\tilde{x}(k+1) = \left[A_d - \left(B_d(GB_d)^{-1}G\left(A_d - \left(1 - \frac{K}{\phi}\right)I\right)\right)\right]\tilde{x}(k) \quad (18)$$

where $\tilde{x}(k) = x_d(k) - x(k)$ are stable, then the discrete time system of equations (10) and (11) under the control law of equation (15) using the observer of equation (16) will have the following properties. First, it will be asymptotically stable if there are no uncertainty and sensor noise; that is, $\tilde{x}(k) \to 0$ as $k \to \infty$ if $w_d(k)=0$, $v(k)=0$.

Second, it will be BIBO stable if $w_d(k)$ and $v(k)$ are bounded.

Accordingly, the control law of equation (15) is stable under the following conditions:

$K = K_1, \quad L = L_1$ when $e < e_{lb}$ $K = K_1 + \frac{(e - e_{lb})(K_2 - K_1)}{(e_{ub} - e_{lb})}$, $L = L_1 + \frac{(e - e_{lb})(L_2 - L_1)}{(e_{ub} - e_{lb})}$ when $e_{lb} \le e \le e_{ub}$ $K = K_2, \quad L = L_2$ when $e > e_{ub}$ $\eta = 0$ when $\hat{s}(k) < \phi$ where e is the error, $e_{lb}$ is a lower boundary (such as the lines 362 in FIG. 9, 372 in FIG. 10, 452 in FIG. 12 and 462 in FIG.

13), $e_{ub}$ is an upper boundary (such as the lines 364 in FIG. 9, 374 in FIG. 10, 454 in FIG. 12 and 464 in FIG. 13) and $K_1$, $K_2$, $L_1$, $L_2$ satisfy the conditions described above with respect to equations (17) and (18).

The manner in which the control system can be preferably implemented will now be discussed. As provided above, SMC is well known for its robustness in handling uncertainties. However, the robustness of SMC is maintained only under the assumption that the control input is implemented continuously or at a very high sampling frequency compared to the plant dynamics. From classical control theory, the chattering problem in SMC is actually due to the inherent high gain control property of SMC within the boundary and such problem is worsened as the sampling rate decreases.

The following equations describe a double integrator plant model for the disc drive 100:

$$PES(k+1) = PES(k) + V(k) + \frac{K_{pt}}{2}u(k) \quad (19)$$

$$V(k+1) = V(k) + K_{pt}u(k) \quad (20)$$

with PES being the position error signal (in tracks) and V being the velocity of a selected head 118 (in tracks per sample). The coefficient $K_{pt}$ is given as follows:

$$K_{pt} = K_p T^2 = \frac{K_1 K_T K_D R_a}{J} T^2 (TPI) \quad (21)$$

with $K_I$=Transconductance Amp Constant (amps/volt)
$K_T$=Torque Constant (ounce-inches/amp)
$K_D$=Demodulator Gain (volts/track)
$R_a$=Arm Radius (inches)
J=Actuator Inertia (ounce inches/sec$^2$)
T=Multirate Sampling Period (sec)
TPI=Tracks Per Inch (tracks/inch).

Then, the plant model (in state space form) will be:

$$x(k+1)=A_d x(k)+B_d u(k) \quad (22)$$

$$y(k)=C_d x(k) \quad (23)$$

where $$x(k) = \begin{bmatrix} PES(k) \\ V(k) \end{bmatrix}, \quad A_d = \begin{bmatrix} 1 & 1 \\ 0 & 1 \end{bmatrix},$$

$$B_d = \begin{bmatrix} K_{pt}/2 \\ K_{pt} \end{bmatrix}, \quad C_d = [1 \ 0].$$

The augmented plant model including a bias disturbance is:

$$x_a(k+1)=A_{ad} x_a(k)+B_{ad} u(k) \quad (24)$$

$$y(k)=C_{ad} x_a(k) \quad (25)$$

where $$x_a(k) = \begin{bmatrix} PES(k) \\ V(k) \\ w_d(k) \end{bmatrix}, \quad A_{ad} = \begin{bmatrix} 1 & 1 & K_{pt}/2 \\ 0 & 1 & K_{pt} \\ 0 & 0 & 1 \end{bmatrix},$$

$$B_{ad} = \begin{bmatrix} K_{pt}/2 \\ K_{pt} \\ 0 \end{bmatrix}, \quad C_{ad} = [1 \ 0 \ 0].$$

From equation (18), G should be chosen so that the closed-loop system is stable. It has been found that for a second-order system, one eigenvalue of the controller is $\{1-(K/\phi)\}$ and the other eigenvalue is the root of the equation Gx=0. From this, it will be recognized that the well-known separation principle applies. Therefore, the eigenvalues of the closed-loop system will be composed of eigenvalues from both the controller and the observer.

There are a variety of methods that can be employed in the initial design; however, the final parameter optimization will likely require some trial and error, as sufficiently accurate disturbance and noise models are not generally available for disc drives. Moreover, it is important to maintain certain performance characteristics within the linear region, such as phase margin, gain margin and sensor noise rejection, similar to those of a traditional linear controller design. This can generally be accomplished by maintaining the same crossover frequency as that of a linear controller when operating within the boundary layer.

Having concluded a discussion of the manner in which the preferred embodiments of the present invention can be advantageously implemented, examples of improvements in shock and vibration response will be presented for a variety of computer simulations and experimental measurements from actual disc drives utilizing a conventional linear controller and the DSMCVP controller of the present invention.

Figure 14:
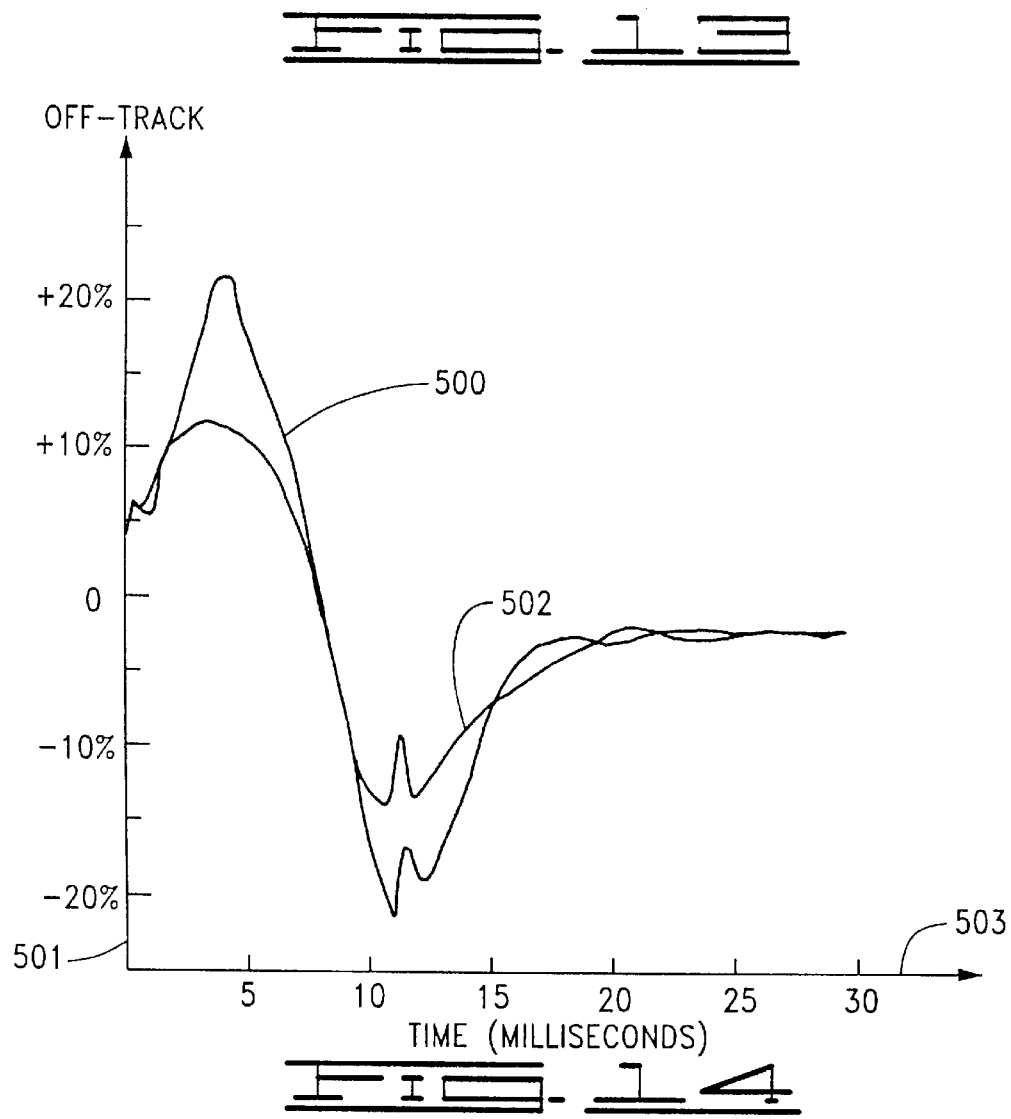
FIG. 14 shows a graphical representation of position error Xerr response of both a linear controller of the prior art and a DSMCVP controller of the present invention from a 11 millisecond, 20 g shock input, in order to illustrate the benefits of the present invention.

Referring first to FIG. 14, shown therein is a graphical representation of the offtrack position error Xerr (y-axis 501) versus time (x-axis 503) in response to a single 11 millisecond, 20 g shock input. More particularly, curve 500 corresponds to the position error Xerr for the linear controller and curve 502 corresponds to the position error Xerr for the DSMCVP controller. As shown in FIG. 14, the shock event induced maximum excursions in position error Xerr of about +21% and −20% offtrack for the linear controller, compared to maximum excursions of about +13% and −14% for the DSMCVP controller. Using a write fault threshold of ±15% as discussed above, it can be seen that the occurrence of the shock event during a write operation would result in the declaration of a write fault using the linear controller, whereas the DSMCVP controller maintains the position error Xerr within the write fault tolerance band.

Figure 15:
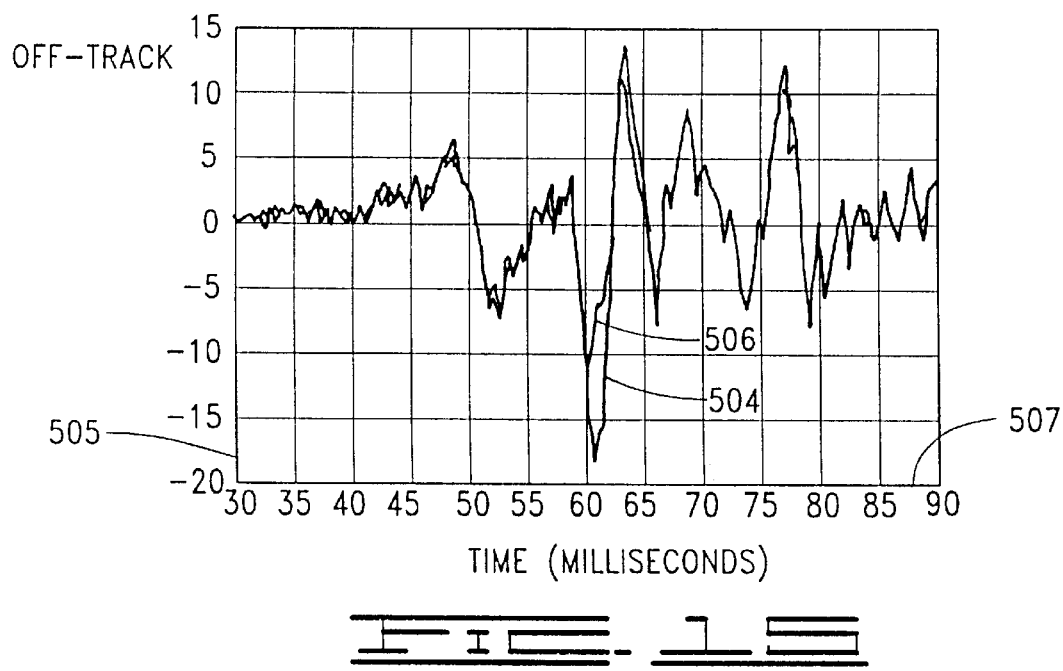
FIG. 15 shows a graphical representation of position error Xerr response of both the linear controller and the DSMCVP controller from a sequence of 10 combined axially and radially directed shock inputs.

FIG. 15 shows a graphical representation of the average offtrack position error Xerr (y-axis 505) versus time (x-axis 507) in response to 10 repetitive shock inputs of both 11 millisecond, 20 g in an axial direction (i.e., parallel to the axis of the discs 108) and 28 radians/sec$^2$ in a rotational direction (i.e., about the axis of the discs 108). Curve 504 corresponds to the linear controller response and curve 506 corresponds to the DSMCVP controller response. As shown in FIG. 15, the peak error for the linear controller is about 18.4%, whereas the peak error for the DSMCVP controller is about 11.6%.

Figure 16:
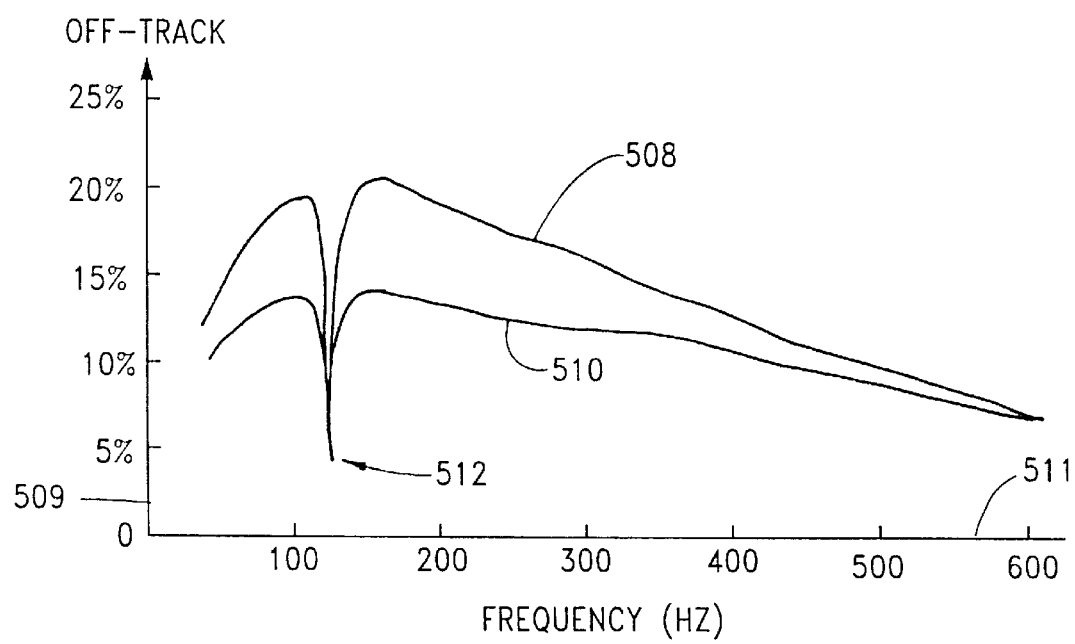
FIG. 16 shows a graphical representation of position error Xerr response of both the linear controller and the DSMCVP controller over a vibration frequency range of from 40 Hertz (Hz) up to 600 Hz.

Finally, FIG. 16 shows a graphical representation of the offtrack position error Xerr (y-axis 509) versus frequency (x-axis 511) for a continuous vibrational input of constant amplitude and a variable frequency from 40 Hertz (Hz) up to 600 Hz. Curve 508 corresponds to the linear controller response and curve 510 corresponds to the DSMCVP controller response. It will be noted that both of the curves 508, 510 converge to a minimum value at point 512, which corresponds to a vibrational input of 120 Hz. The reason for this convergence is that the disc drive 100 rotates the discs 108 at a rotational speed of 7200 revolutions per minute (which corresponds to 120 revolutions per second) and employs repeatable runout compensation techniques as are generally known in the art to compensate for repeated position error frequency components of 120 Hz induced by disc misalignments. Accordingly, external vibrational inputs corresponding to the rotational frequency of the discs are automatically compensated for by the disc drive 100. Nevertheless, except for frequencies near 120 Hz, it will be recognized that the DSMCVP controller provides significantly improved vibrational response performance over that provided by the conventional linear controller.

In view of the foregoing discussion, it will be recognized that the preferred embodiments of the present invention provide significant advantages over the prior art. Particularly, the DSMCVP controller will accommodate substantial increases in track density while still providing robust shock and vibration response characteristics, as will be required in future generations of disc drives. On the other hand, the performance characteristics of disc drives employing traditional linear controllers will likely continue to degrade with increases in track denisty, due to the inherent limitations of such controllers.

Absent implementation of the DSMCVP controller of the present invention, a disc drive designer relying on traditional linear control techniques would generally have to increase the amount of servo information on the discs in order to maintain adequate shock and vibration response characteristics in light of increases in track densities. Of course, such an approach would generally decrease the overall user data storage capacity of the disc drive (as more servo information is added) or would generally increase the cost of the drive (as additional discs and heads would be required to maintain the same user data capacity).

Accordingly, in view of the foregoing it will be understood that the present invention is directed to an apparatus and method for improving vibration and mechanical shock response of a system providing positional control of a control object using discrete-time sliding mode control with variable parameters. In accordance with the disclosed embodiments, a servo circuit (such as 150) is provided for controlling the position of an object (such as a head 118 of a disc drive 100). The servo circuit includes position error circuitry (such as 322, 422) which determines a position error Xerr and variable position gain circuitry (such as 330, 334, 338 and 430) which applies a variable position gain to the position error Xerr, the variable position gain varying with respect to the magnitude of the position error Xerr.

Additionally, velocity error circuitry (such as 326, 426) determines a velocity error Verr and variable velocity gain circuitry (such as 332, 336, 340 and 432) applies a variable velocity gain to the velocity error Verr. In the first disclosed embodiment, the variable velocity gain is a function of the position error Xerr, whereas in the second disclosed embodiment the variable velocity gain is a function of both the position error Xerr and the velocity error Verr.

An observer (such as 306, 406) generates head position and velocity estimates and a reference generator (such as 314, 414) generates head position and velocity references.

For purposes of the claims, the term "circuitry" will be understood to cover both hardware and software implementations. Moreover, the term "signal" will be understood to include a digitally expressed signal and the term "magnitude" will be understood to include the value of such a digitally expressed signal.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims. Moreover, although the preferred embodiments of the present invention have been directed to disc drives, it will be readily understood that the present invention can be readily extended to other systems wherein a control object is positioned by a servomotor under control of a servo circuit.

What is claimed is:

1. A servo circuit for positioning a control object using discrete-time sliding mode control with variable parameters, comprising:

position error circuitry determining a position error with respect to the control object; and position error gain circuitry, responsive to the position error circuitry, which applies a variable position gain to the position error, the variable position gain varying in accordance with the magnitude of the position error, the variable position gain applied by the position error gain circuitry comprising a low gain value for position errors below a first threshold, a high gain value for position errors above a second threshold, and a variable gain function for position errors between the first and second thresholds, the high gain value being greater than the low gain value and the variable gain function having boundry values corresponding to the low and high gain values.

2. The servo circuit of claim 1, wherein the control object is a head of a disc drive, wherein the first threshold comprises a nominal position error cut-off point indicative of nominal position error for the disc drive in the absence of external shock and vibration inputs to the disc drive, and wherein the second threshold comprises a write fault threshold for the disc drive.

3. A disk drive having improved vibration and mechanical shock responsive through the use of discrete-time sliding mode control with variable parameters, the disk drive comprising:

a servo circuit for positioning a head of the disk drive with respect to tracks defined on a rotatable disc of the disc drive, the servo circuit comprising:

position error circuitry determining a head position error with respect to a selected track during track following; and position error gain circuitry, responsive to the position error circuitry, which applies a variable position gain to the head position error, the variable position gain varying with respect to the magnitude of the head position error, the variable position gain comprising a low gain value for head position errors below a first threshold, a high gain value for head position errors above a second threshold, and a variable gain function for head position error between the first and second thresholds, the high gain value being greater than the low gain value and the variable gain function having boundary values corresponding to the low and high gain values.

4. The disc drive of claim 3, wherein the first threshold comprises a nominal position error cut-off point indicative of nominal head position error for the disc drive in the absence of external shock and vibration inputs, and wherein the second threshold comprises a write fault threshold for the disc drive.

5. A method for controlling the position of a control object by way of a servomotor using discrete-time sliding mode control with variable parameters, comprising the steps of:
 a) determining a reference position and a reference velocity for the control object;
 b) determining an estimated position and an estimated velocity for the control object;
 c) deriving a position error from the difference between the reference position and the estimated position, the position error having a magnitude;
 d) deriving a velocity error from the difference between the reference velocity and the estimated velocity, the velocity error having a magnitude;
 e) applying a variable position gain to the position error to determine a position error product, the variable position gain varying with respect to the magnitude of the position error, said step of applying a variable position gain comprising:
  (e)(1) applying a low position gain when the magnitude of the position error is below a first threshold;
  (e)(2) applying a high position gain when the magnitude of the position error is above a second threshold, the high position gain being greater than the low position gain; and
  (e)(3) applying a variable gain in accordance with a variable gain function when the position error is between the first and second thresholds, the variable gain function having boundary values corresponding to the low and high gain values;
 f) applying a variable velocity gain to the velocity error to determine a velocity error product, the variable velocity gain varying with respect to at least the magnitude of the position error; and
 g) using the position error product and the velocity error product to control the position of the control object.

6. The method of claim 5, wherein the control object is a head of a disc drive, the first threshold comprises a nominal position error cut-off point indicative of nominal position error for the disc drive in the absence of external shock and vibration inputs, and wherein the second threshold comprises a write fault threshold for the disc drive.

7. In a disc drive of the type having a head controllably positionable with respect to tracks on a rotatable disc through the use of a voice coil motor, a method for controlling the position of the head using discrete-time sliding mode control with variable parameters, characterized by:
 (a) generating a reference position signal having a magnitude indicative of a reference position for the head;
 (b) generating an estimated position signal having a magnitude indicative of an estimated position of the head;
 (c) deriving a position error signal from the reference and estimated position signals, the position error signal having a magnitude in proportion to the difference between the magnitudes of the reference and estimated position signals;
 (d) applying a variable position gain signal to the position error signal to determine a position error product signal, the variable position gain signal having a magnitude that varies with respect to the magnitude of the position error signal, further characterized by:
  (1) using a first magnitude of the variable position gain signal when the magnitude of the position error signal is less than a first threshold;
  (2) using a second magnitude of the variable position gain signal when the magnitude of the position error signal is greater than a second threshold, the second magnitude being greater than the first magnitude and the second threshold being greater than the first threshold; and
  (3) using a variable magnitude of the variable position gain signal which varies in accordance with a variable gain function when the magnitude of the position error signal is between the first and second thresholds, the variable position gain function having boundary values corresponding to the first and second magnitudes; and
 (e) using the position error product signal to control the position of the head.

8. The method of claim 7, wherein the first threshold comprises a nominal position error cut-off point indicative of nominal excursions of the magnitude of the position error signal in the absence of external shock and vibration inputs to the disc drive, and wherein the second threshold comprises a write fault threshold for the disc drive in that a write fault condition is declared by the disc drive for magnitudes of the position error signal greater than the write fault threshold.

9. The method of claim 7, further characterized by:
 (f) generating a reference velocity signal having a magnitude indicative of a reference velocity for the head;
 (g) generating an estimated velocity signal having a magnitude indicative of an estimated velocity of the head;
 (h) deriving a velocity error signal from the reference and estimated velocity signals, the velocity error signal having a magnitude in proportion to the difference between the magnitudes of the reference and estimated velocity signals;
 (i) applying a variable velocity gain signal to the velocity error signal to determine a velocity error product signal, the variable velocity gain signal having a magnitude that varies in accordance with the magnitude of the position error signal; and
 (j) using the velocity error product signal to control the position of the head.

10. The method of claim 9, wherein step (i) is further characterized by:
 (1) additionally varying the magnitude of the variable velocity gain signal in accordance with the magnitude of the velocity error signal.

* * * * *

UNITED STATES PATENT AND TRADEMARK OFFICE
CERTIFICATE OF CORRECTION

PATENT NO. : 6,046,878
DATED : April 4, 2000
INVENTOR(S) : Zhiqiang Liu, Otis L. Funches and Randall D. Hampshire Page 1 of 1

It is certified that error appears in the above-identified patent and that said Letters Patent is hereby corrected as shown below:

Column 3,
Line 24, repalce "a flnction of" with -- a function of --.

Column 6,
Line 44, replace "server processor 156" with -- servo processor 156 --.

Column 8,
Line 39, replace "PBS distribution" with -- PES distribution --.

Column 18,
Line 41, replace "responsive through" with -- response through --.

Signed and Sealed this

Thirtieth Day of October, 2001

Attest:

NICHOLAS P. GODICI
*Attesting Officer*   *Acting Director of the United States Patent and Trademark Office*